United States Patent
Bates et al.

(10) Patent No.: US 8,687,347 B2
(45) Date of Patent: Apr. 1, 2014

(54) PLANAR ANODE FOR USE IN A WET ELECTROLYTIC CAPACITOR

(75) Inventors: James Steven Bates, Saco, ME (US); Robert Hazen Pease, North Berwick, ME (US)

(73) Assignee: AVX Corporation, Fountain Inn, SC (US)

( * ) Notice: Subject to any disclaimer, the term of this patent is extended or adjusted under 35 U.S.C. 154(b) by 407 days.

(21) Appl. No.: 13/005,104

(22) Filed: Jan. 12, 2011

(65) Prior Publication Data
US 2012/0179217 A1     Jul. 12, 2012

(51) Int. Cl.
*H01G 9/04*     (2006.01)
*H01G 9/145*    (2006.01)

(52) U.S. Cl.
USPC .......................... 361/508; 361/516

(58) Field of Classification Search
USPC ....................... 361/508, 509, 516
See application file for complete search history.

(56) References Cited

U.S. PATENT DOCUMENTS

| | | | |
|---|---|---|---|
| 3,647,415 A * | 3/1972 | Yano et al. ............ 428/402 |
| 5,211,741 A | 5/1993 | Fife | |
| 5,369,547 A | 11/1994 | Evan | |
| 5,580,367 A | 12/1996 | Fife | |
| 5,729,428 A | 3/1998 | Sakata et al. | |
| 5,808,857 A | 9/1998 | Stevens | |
| 5,922,215 A | 7/1999 | Pless et al. | |
| 5,926,362 A | 7/1999 | Muffoletto et al. | |
| 5,954,856 A | 9/1999 | Pathare et al. | |
| 5,968,210 A | 10/1999 | Strange et al. | |
| 6,051,044 A * | 4/2000 | Fife ........................ 75/229 |
| 6,110,622 A | 8/2000 | Frysz et al. | |
| 6,238,456 B1 | 5/2001 | Wolf et al. | |
| 6,421,226 B1 | 7/2002 | O'Phelan et al. | |
| 6,426,864 B1 | 7/2002 | O'Phelan et al. | |
| 6,461,771 B1 | 10/2002 | Frysz et al. | |
| 6,556,863 B1 | 4/2003 | O'Phelan et al. | |
| 6,594,140 B1 | 7/2003 | Evans et al. | |
| 6,659,283 B1 | 12/2003 | Muffoletto et al. | |

(Continued)

FOREIGN PATENT DOCUMENTS

| | | |
|---|---|---|
| JP | 2005/033097 A | 2/2005 |
| WO | WO 9303101 A1 | 2/1993 |
| WO | WO 2006/105766 A1 | 10/2006 |
| WO | WO 2007/089982 A1 | 8/2007 |

OTHER PUBLICATIONS

Search Report for GB1122264.3 dated Apr. 25, 2012, 5 pages.

*Primary Examiner* — David M Sinclair
(74) *Attorney, Agent, or Firm* — Dority & Manning, P.A.

(57) ABSTRACT

A relatively thin planar anode for use in a wet electrolytic capacitor is provided. Through a combination of specific materials and processing techniques, the present inventors have surprisingly discovered that the resulting anode may possess a high volumetric efficiency, yet still be able to operate at a high voltage and capacitance, resulting in a capacitor with a high energy density. The anode is a pressed pellet formed from an electrically conductive powder that contains a plurality of particles (including agglomerates thereof) having a flake-like morphology. The present inventors have discovered that such a morphology can optimize packing density, which reduces the thickness of the anode and improves volumetric efficiency. Such particles can provide a short transmission line between the outer surface and interior of the anode and a highly continuous and dense wire-to-anode connection with high conductivity. The particles may also increase the breakdown voltage and help lower ESR.

17 Claims, 7 Drawing Sheets

(56) References Cited

U.S. PATENT DOCUMENTS

| | | | |
|---|---|---|---|
| 6,727,022 B2 | 4/2004 | Gan et al. | |
| 6,801,424 B1 | 10/2004 | Nielsen et al. | |
| 6,819,544 B1 | 11/2004 | Nielsen et al. | |
| 6,850,405 B1 | 2/2005 | Mileham et al. | |
| 6,858,126 B1 | 2/2005 | Hemphill et al. | |
| 6,965,510 B1 | 11/2005 | Liu et al. | |
| 7,002,790 B2 | 2/2006 | Hossick-Schott et al. | |
| 7,012,799 B2 | 3/2006 | Muffoletto et al. | |
| 7,043,300 B2 | 5/2006 | O'Phelan et al. | |
| 7,099,143 B1 | 8/2006 | Fife et al. | |
| 7,142,408 B2 | 11/2006 | Wang | |
| 7,156,893 B2 * | 1/2007 | Habecker et al. | 75/255 |
| 7,169,284 B1 | 1/2007 | Jiang et al. | |
| 7,224,576 B2 | 5/2007 | Hossick-Schott | |
| 7,256,982 B2 | 8/2007 | Lessner et al. | |
| 7,342,774 B2 | 3/2008 | Hossick-Schott et al. | |
| 7,445,646 B1 | 11/2008 | Strange et al. | |
| 7,483,260 B2 | 1/2009 | Ziarniak et al. | |
| 7,499,260 B2 | 3/2009 | Schott et al. | |
| 7,515,396 B2 | 4/2009 | Biler | |
| 7,554,792 B2 * | 6/2009 | Ning | 361/516 |
| 7,555,339 B2 | 6/2009 | Nielsen et al. | |
| 7,558,051 B2 | 7/2009 | O'Phelan et al. | |
| 7,666,247 B2 | 2/2010 | He et al. | |
| 7,667,954 B2 | 2/2010 | Lessner et al. | |
| 7,684,171 B2 | 3/2010 | Rorvick et al. | |
| 7,731,893 B2 | 6/2010 | Freeman et al. | |
| 7,813,107 B1 | 10/2010 | Druding et al. | |
| 7,837,743 B2 | 11/2010 | Gaffney et al. | |
| 7,879,217 B2 | 2/2011 | Goad et al. | |
| 7,983,022 B2 | 7/2011 | O'Connor et al. | |
| 2004/0243183 A1 | 12/2004 | Norton et al. | |
| 2007/0172377 A1 * | 7/2007 | Fife et al. | 419/8 |
| 2008/0232029 A1 * | 9/2008 | Ning | 361/503 |
| 2008/0232030 A1 * | 9/2008 | Jones et al. | 361/503 |
| 2008/0292958 A1 * | 11/2008 | Nielsen et al. | 429/180 |
| 2009/0103243 A1 | 4/2009 | Mizukoshi et al. | |
| 2009/0117457 A1 | 5/2009 | Davis et al. | |
| 2009/0273885 A1 | 11/2009 | Jiang et al. | |
| 2010/0142124 A1 | 6/2010 | Dreissig et al. | |
| 2010/0326967 A1 | 12/2010 | Freitag et al. | |

\* cited by examiner

US 8,687,347 B2

PLANAR ANODE FOR USE IN A WET ELECTROLYTIC CAPACITOR

BACKGROUND OF THE INVENTION

High voltage electrolytic capacitors are employed as energy storage reservoirs in many applications, including implantable medical devices. These capacitors are required to have a high energy density because it is desirable to minimize the overall size of the implanted device. This is particularly true of an implantable cardioverter defibrillator ("ICD"), also referred to as an implantable defibrillator, because the high voltage capacitors used to deliver the defibrillation pulse can occupy as much as one third of the ICD volume. ICDs typically use two electrolytic capacitors in series to achieve the desired high voltage for shock delivery.

One strategy for increasing energy density in the capacitor, and thus reducing its size, is to minimize the volume taken up by the paper and cathode and maximize the number of anodes. This may be achieved by using a multi-anode stack configuration. A multiple anode stack configuration requires fewer cathodes and paper spacers than a single anode configuration and thus reduces the size of the device. A multiple anode stack includes a number of units that contain a cathode, a paper spacer, two or more anodes, a paper spacer and a cathode, with neighboring units sharing the cathode between them. However, to charge and discharge the inner anodes (furthest from the cathode), charge must flow through the outer anodes. With a typical anode, the path through an anode is quite tortuous and results in a high equivalent series resistance ("ESR") for the multi-anode configuration. Thus, ESR increases as more anodes are placed together in the stack. Another strategy for decreasing the size of the device is to increase the operating voltage of the capacitor, which may potentially allow for the use of only one electrolytic capacitor. The unique challenge of increasing the operating voltage of the capacitor, however, is that high voltage is usually correlated with a low surface area, which reduces capacitance and likewise energy ($E=0.5*CV^2$).

Regardless of the particular strategy employed, metal foils (e.g., aluminum foil) have often been employed in the electrolytic capacitor due to their small size. Because the electrostatic capacitance of the capacitor is proportional to its electrode area, the surface of the metallic foil may be, prior to the formation of the dielectric film, roughened or subjected to a chemical conversion to increase its effective area. This step of roughening the surface of the metallic foil is called etching. Etching is normally carried out either by the method (chemical etching) of conducting immersion into a solution of hydrochloric acid or by the method (electrochemical etching) of carrying out electrolysis in an aqueous solution of hydrochloric acid. The capacitance of the electrolytic capacitor is determined by the extent of roughing (the surface area) of the anode foil and the thickness and the dielectric constant of the oxide film. Due to the limited surface area that may be provided by etching metallic foils, attempts have also been made to employ porous sintered pellets in wet electrolytic capacitors. A tantalum pellet, for instance, may be formed by compressing a powder under high pressure and sintering at high temperature to form a sponge-like structure, which is very strong and dense but also highly porous. The porosity of the resulting tantalum pellet provides a large internal surface area. Despite its high surface area, however, anode pellets may still present high ESR and sensitivity of the capacitance to frequency, particularly at the high voltages often encountered in medical devices. Further, the pellets are typically larger in size than the anode foils, thus making it difficult to incorporate them into application in which high volumetric efficiency is needed.

As such, a need currently exists for an improved electrolytic capacitor for use in implantable medical devices, such as defibrillators.

SUMMARY OF THE INVENTION

In accordance with one embodiment of the present invention, a planar anode for use in a high voltage, wet electrolytic capacitor is disclosed. The anode has a thickness of about 5 millimeters or less, and the ratio of the length of the anode to the thickness of the anode is from about 5 to about 50. The anode includes an anodically oxidized pellet formed from a pressed and sintered powder, wherein the powder contains a plurality of flake particles having an aspect ratio of from about 2 to about 100.

In accordance with another embodiment of the present invention, a method for forming a planar anode for use in a high voltage, wet electrolytic capacitor is disclosed. The method comprises pressing a valve metal powder in a direction that is perpendicular to the longitudinal axis of an anode lead wire embedded therein, wherein the powder contains a plurality of flake particles oriented in the longitudinal direction. The pressed powder is sintered at a temperature of from about 1300° C. to about 2000° C. to form a pellet. The pellet is anodically oxidized to form a dielectric layer, wherein the anodically oxidized pellet has a thickness of about 5 millimeters or less.

In accordance with yet another embodiment of the present invention, a wet electrolytic capacitor is disclosed that comprises a planar anode having a thickness of about 5 millimeters or less. The ratio of the length of the anode to the thickness of the anode is from about 5 to about 50. The anode includes an anodically oxidized pellet formed from a pressed and sintered powder. The capacitor also comprises a cathode that comprises a metal substrate coated with an electrochemically active material, and an aqueous electrolyte in communication with the anode and the cathode. The electrolyte has a pH of from about 4.5 to about 7.0. The ratio of the voltage to which the capacitor is capable of being charged to the voltage at which the dielectric layer is formed is greater than about 1.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which:

FIG. 5 is a schematic illustration of one embodiment for pressing a flake tantalum powder into a pellet, in which

Figure 1:
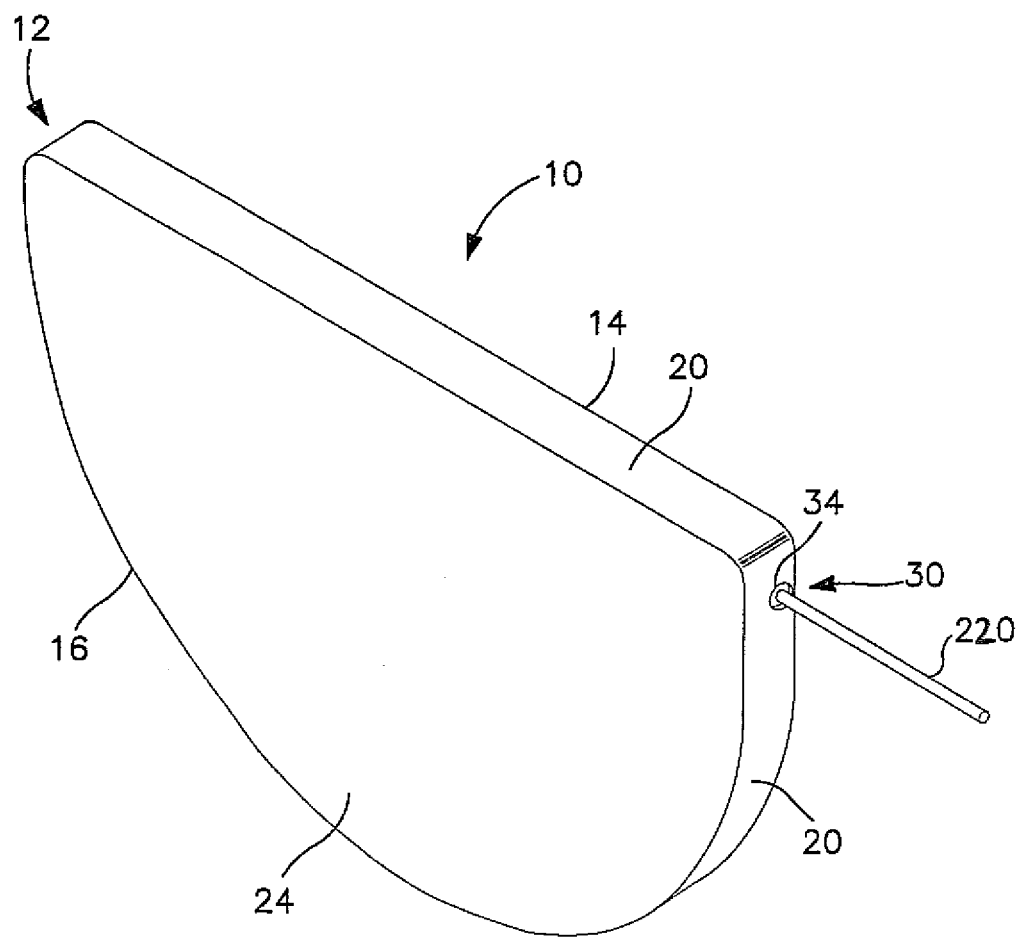
FIG. 1 is a perspective view of one embodiment of the wet electrolytic capacitor of the present invention.

Repeat use of reference characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a relatively thin planar anode for use in a wet electrolytic capacitor. Through a combination of specific materials and processing techniques, the present inventors have surprisingly discovered that the resulting anode may possess a high volumetric efficiency, and yet still be able to operate at a high voltage and capacitance, thus resulting in a capacitor with a high energy density. More particularly, the anode is a pressed pellet formed from an electrically conductive powder that contains a plurality of particles (including agglomerates thereof). The particles may have a flake-like morphology in that they possess a relatively flat or platelet shape. The present inventors have discovered that such a particle morphology can optimize packing density, and thus reduce the thickness of the anode and improve volumetric efficiency. Such particles can also provide a short transmission line between the outer surface and interior of the anode and also provide a highly continuous and dense wire-to-anode connection with high conductivity. Among other things, this may help increase the specific charge of the anode when anodized at higher voltages, thereby increasing energy density. The particles may also increase the breakdown voltage (voltage at which the capacitor fails) and help lower equivalent series resistance ("ESR").

Various embodiments of the capacitor of the present invention will now be described in more detail.

I. Anode

The particles of the anode are typically formed from a valve metal composition. The specific charge of the composition may vary, such as from about 2,000 µF*V/g to about 80,000 µF*V/g, in some embodiments from about 5,000 µF*V/g to about 40,000 µF*V/g or more, and in some embodiments, from about 10,000 to about 20,000 µF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. The niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and 7,220,397 to Kimmel, et al., as well as U.S. patent application Publication Nos. 2005/0019581 to Schnitter; 2005/0103638 to Schnitter, et al.; 2005/0013765 to Thomas, et al., all of which are incorporated herein in their entirety by reference thereto for all purposes.

The valve metal composition may be formed using techniques known to those skilled in the art. A precursor tantalum powder, for instance, may be formed by reducing a tantalum salt (e.g., potassium fluotantalate ($K_2TaF_7$), sodium fluotantalate ($Na_2TaF_7$), tantalum pentachloride ($TaCl_5$), etc.) with a reducing agent (e.g., hydrogen, sodium, potassium, magnesium, calcium, etc.). The precursor powder may initially contain particles in a granular form, which can then be deformed or flattened into the preferred flake morphology using known techniques. One technique for reducing the thickness of the particles includes subjecting the powder to a mechanical milling process that grinds the particles into a smaller size. Any of a variety of milling techniques may be utilized in the present invention to achieve the desired particle characteristics. For example, the powder may be dispersed in a fluid medium (e.g., ethanol, methanol, fluorinated fluid, etc.) to form a slurry. The slurry may then be combined with a grinding media (e.g., metal balls, such as tantalum) in a mill. The number of grinding media may generally vary depending on the size of the mill, such as from about 100 to about 2000, and in some embodiments from about 600 to about 1000. The starting powder, the fluid medium, and grinding media may be combined in any proportion. For example, the ratio of the starting valve metal powder to the grinding media may be from about 1:5 to about 1:50. Likewise, the ratio of the volume of the fluid medium to the combined volume of the starting valve metal powder may be from about 0.5:1 to about 3:1, in some embodiments from about 0.5:1 to about 2:1, and in some embodiments, from about 0.5:1 to about 1:1. Some examples of mills that may be used in the present invention are described in U.S. Pat. Nos. 5,522,558; 5,232,169; 6,126,097; and 6,145,765, which are incorporated herein in their entirety by reference thereto for all purposes.

Milling may occur for any predetermined amount of time needed to achieve the target specific surface area. For example, the milling time may range from about 30 minutes to about 40 hours, in some embodiments, from about 1 hour to about 20 hours, and in some embodiments, from about 5 hours to about 15 hours. Milling may be conducted at any desired temperature, including at room temperature or an elevated temperature. After milling, the fluid medium may be separated or removed from the powder, such as by air-drying, heating, filtering, evaporating, etc. For instance, the flake powder may optionally be subjected to one or more acid leaching steps to remove metallic impurities. Such acid leaching steps are well known in the art and may employ any of a variety of acids, such as mineral acids (e.g., hydrochloric acid, hydrobromic acid, hydrofluoric acid, phosphoric acid, sulfuric acid, nitric acid, etc.), organic acids (e.g., citric acid, tartaric acid, formic acid, oxalic acid, benzoic acid, malonic acid, succinic acid, adipic acid, phthalic acid, etc.); and so forth.

Although not required, the powder may be agglomerated using any technique known in the art. Such powders may be agglomerated in a variety of ways, such as through one or multiple heat treatment steps at a temperature of from about 700° C. to about 1400° C., in some embodiments from about 750° C. to about 1200° C., and in some embodiments, from about 800° C. to about 1100° C. Heat treatment may occur in an inert or reducing atmosphere. For example, heat treatment may occur in an atmosphere containing hydrogen or a hydrogen-releasing compound (e.g., ammonium chloride, calcium hydride, magnesium hydride, etc.) to partially sinter the powder and decrease the content of impurities (e.g., fluorine). If desired, agglomeration may also be performed in the presence of a getter material, such as magnesium. After thermal treatment, the particles may be passivated by the gradual admission of air. Other suitable agglomeration techniques are also described in U.S. Pat. No. 6,576,038 to Rao; U.S. Pat. No. 6,238,456 to Wolf, et al.; U.S. Pat. No. 5,954,856 to Pathare, et al.; U.S. Pat. No. 5,082,491 to Rerat; U.S. Pat. No. 4,555,268 to Getz; U.S. Pat. No. 4,483,819 to Albrecht, et al.; U.S. Pat. No. 4,441,927 to Getz, et al.; and U.S. Pat. No 4,017,302 to Bates, et al., which are incorporated herein in their entirety by reference thereto for all purposes.

Various other conventional treatments may also be employed in the present invention to improve the properties of the powder. For example, in certain embodiments, the powder may be doped with sinter retardants in the presence of a dopant, such as aqueous acids (e.g., phosphoric acid). The amount of the dopant added depends in part on the surface area of the powder, but is typically present in an amount of no more than about 200 parts per million ("ppm"). The dopant may be added prior to, during, and/or subsequent to any heat treatment step(s). The powder may also be subjected to one or more deoxidation treatments to improve ductility and reduce leakage current in the anodes. For example, the powder may be exposed to a getter material (e.g., magnesium), such as described in U.S. Pat. No. 4,960,471, which is incorporated herein in its entirety by reference thereto for all purposes. The getter material may be present in an amount of from about 2% to about 6% by weight. The temperature at which deoxidation occurs may vary, but typically ranges from about 700° C. to about 1600° C., in some embodiments from about 750° C. to about 1200° C., and in some embodiments, from about 800° C. to about 1000° C. The total time of deoxidation treatment (s) may range from about 20 minutes to about 3 hours. Deoxidation also preferably occurs in an inert atmosphere (e.g., argon). Upon completion of the deoxidation treatment(s), the magnesium or other getter material typically vaporizes and forms a precipitate on the cold wall of the furnace. To ensure removal of the getter material, however, the powder may be subjected to one or more acid leaching steps, such as with nitric acid, hydrofluoric acid, etc. Still other suitable techniques for forming flake powders may be described, for instance, in U.S. Pat. Nos. 6,348,113; 5,580,367; 5,580,516; 5,448,447; 5,261,942; 5,242,481; 5,211,741; 4,940,490; and 4,441,927, which are incorporated herein in their entirety by reference thereto for all purposes.

Regardless of the particular method employed, the resulting powder has certain characteristics that enhance its ability to be formed into a capacitor anode. For example, when employed, the flake particles are generally flat. The degree of flatness is generally defined by the "aspect ratio", i.e., the average diameter or width of the particles divided by the average thickness ("D/T"). For example, the aspect ratio of the particles may be from about 2 to about 100, in some embodiments from about 3 to about 50, in some embodiments, from about 4 to about 30. The particles may also have a specific surface area of from about 0.5 to about 10.0 m$^2$/g, in some embodiments from about 0.7 to about 5.0 m$^2$/g, and in some embodiments, from about 1.0 to about 4.0 m$^2$/g. The term "specific surface area" generally refers to surface area as determined by the physical gas adsorption (B.E.T.) method of Bruanauer, Emmet, and Teller, Journal of American Chemical Society, Vol. 60, 1938, p. 309, with nitrogen as the adsorption gas. The test may be conducted with a MONOSORB® Specific Surface Area Analyzer available from QUANTACHROME Corporation, Syosset, N.Y., which measures the quantity of adsorbate nitrogen gas adsorbed on a solid surface by sensing the change in thermal conductivity of a flowing mixture of adsorbate and inert carrier gas (e.g., helium).

The bulk density (also known as Scott density) is also typically from about 0.1 to about 2 grams per cubic centimeter (g/cm$^3$), in some embodiments from about 0.2 g/cm$^3$ to about 1.5 g/cm$^3$, and in some embodiments, from about 0.4 g/cm$^3$ to about 1 g/cm$^3$. "Bulk density" may be determined using a flow meter funnel and density cup. More specifically, the flake sample may be poured through the funnel into the cup until the sample completely fills and overflows the periphery of the cup, and thereafter sample may be leveled-off by a spatula, without jarring, so that it is flush with the top of the cup. The leveled sample is transferred to a balance and weighed to the nearest 0.1 gram to determine the density value. Such an apparatus is commercially available from Alcan Aluminum Corp. of Elizabeth, N.J. The particles may also have an average size (e.g., width) of from about 0.1 to about 100 micrometers, in some embodiments from about 0.5 to about 70 micrometers, and in some embodiments, from about 1 to about 50 micrometers.

To facilitate the construction of the anode, certain additional components may also be included in the powder. For example, the powder may be optionally mixed with a binder and/or lubricant to ensure that the particles adequately adhere to each other when pressed to form the anode body. Suitable binders may include, for instance, poly(vinyl butyral); poly (vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead wire. The wire may be formed from any electrically conductive material, such as tantalum, niobium, aluminum, hafnium, titanium, etc., as well as electrically conductive oxides and/or nitrides of thereof.

Figure 5A:
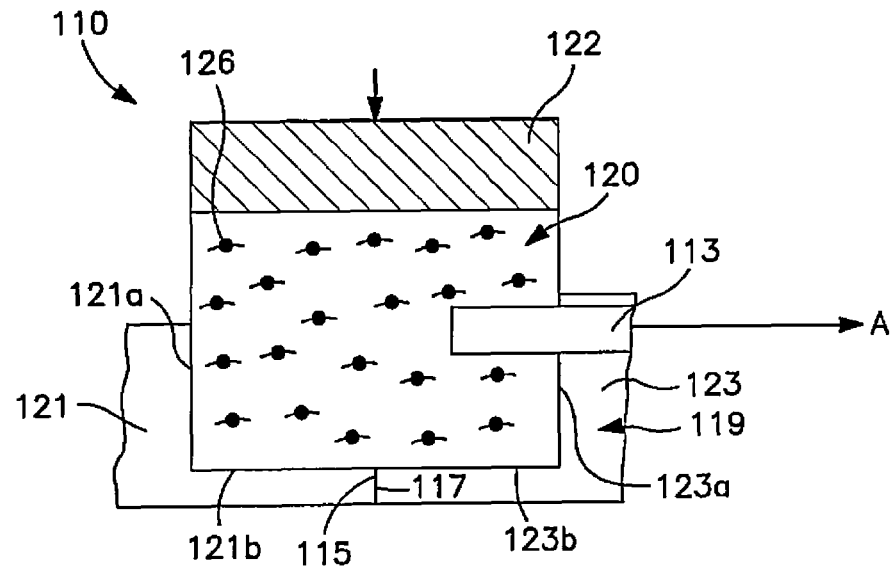
FIG. 5A illustrates the press mold prior to compaction and FIG. 5B illustrates the press mold after compaction.

Referring to FIG. 5, for example, one exemplary embodiment for compacting powder into the shape of a planar anode using a press mold 110 will now be described in more detail. In this particular embodiment, the press mold 110 includes a die 119 having a first die portion 121 and a second die portion 123. Of course, the die 119 may also be formed from a single part instead of multiple portions. Nevertheless, in FIG. 5, the first die portion 121 defines inner walls 121a and 121b, and the second die portion defines inner walls 123a and 123b. The walls 121a and 123a are substantially perpendicular to the walls 121b and 123b, respectively. The first and second die portions 121 and 123 also define opposing surfaces 115 and 117. During use, the surfaces 115 and 117 are placed adjacent to each other so that the walls 121b and 123b are substantially aligned to form a die cavity 120 having a planar D-shaped configuration. It will be appreciated that while a single die cavity is schematically shown in FIG. 5, multiple die cavities may be employed. As shown in FIG. 5A, a certain quantity of powder 126 is loaded into the die cavity 120 and an anode wire 113 is embedded therein. Although shown in this embodiment as having a cylindrical shape, it should be understood that any other shape may also be utilized for the anode wire 113. Further, the anode wire 113 may also be attached (e.g., welded) to the anode subsequent to pressing and/or sintering.

Figure 5B:
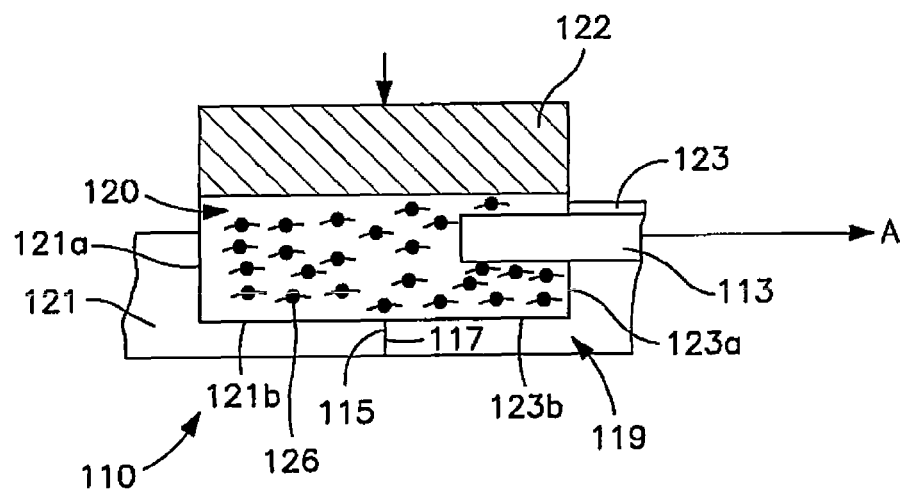

Regardless, after filling, the die cavity 120 is closed from as shown in FIG. 5B by an upper punch 122. It should be understood that additional punches (e.g., a lower punch) may also be utilized. The direction in which the compressive forces are exerted may provide improved properties to the resulting capacitor. For example, as illustrated by the directional arrows in FIG. 5B, the force exerted by the punch 122 is in a direction that is substantially "perpendicular" to a longitudinal axis "A" of the wire 113. That is, the force is typically exerted at an angle of from about 60° to about 120°, and preferably about 90° relative to the axis "A." In this manner, the wire 113 is embedded into the powder 126 so that it may slip into the space between adjacent flakes. The perpendicular pressing technique described above causes the pellet to contain particles (e.g., flakes) generally oriented in the direction of the longitudinal axis of the wire 113 (See also, the "y" direction in FIG. 3). This forces the particles into close contact with the wire and creates a strong wire-to-powder bond.

After pressing, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

Thereafter, the pellet is sintered to form a porous, integral mass. The present inventors have discovered that certain sintering conditions can result in an increase in the specific charge of the resulting anode, as well increase in the breakdown voltage of the resulting capacitor. More particularly, the pellet is typically sintered at a temperature of from about 1300° C. to about 2000° C., in some embodiments from about 1400° C. to about 1800° C., and in some embodiments, from about 1500° C. to about 1700° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr in some embodiments from about 100 Torr to about 1000 Torr, and in some embodiments, from about 100 Torr to about 930 Torr. Mixtures of hydrogen and other gases (e.g., argon or nitrogen) may also be employed. When employed, flake particles may be better able to withstand the high sintering temperatures and prolonged sintering times often employed in forming the anode, and produce a porous sintered body with low shrinkage and a large specific surface area.

Upon sintering, the pellet shrinks due to the growth of metallurgical bonds between the particles (e.g., flakes). Because shrinkage generally increases the density of the pellet, lower press densities ("green") may be employed to still achieve the desired target density. For example, the target density of the pellet after sintering is typically from about 7.5 to about 8 grams per cubic centimeter. As a result of the shrinking phenomenon, however, the pellet need not be pressed to such high densities, but may instead be pressed to densities of less than about 7.5 grams per cubic centimeter, and in some embodiments, from about 6 to about 7.5 grams per cubic centimeter. Among other things, the ability to employ lower green densities may provide significant cost savings and increase processing efficiency. It should be understood that the pressed density may not always be uniform across the pellet, particularly if compression occurs in a direction perpendicular to the longitudinal axis of the wire. Namely, the pressed density is determined by dividing the amount of material by the volume of the pressed pellet. The volume of the pellet is directly proportional to the compressed length in the direction perpendicular to the longitudinal axis of the wire. The density is inversely proportional to the compressed length. Thus, the compressed length is actually lower at those locations adjacent to the wire than the remaining locations of the pellet. The pressed density is likewise greater at those locations adjacent to the wire. For example, the density of the pellet at those locations adjacent to the wire is typically at least about 10% greater, and in some cases, at least about 20% greater than the pressed density of the pellet at the remaining locations of the pellet.

Figure 2:
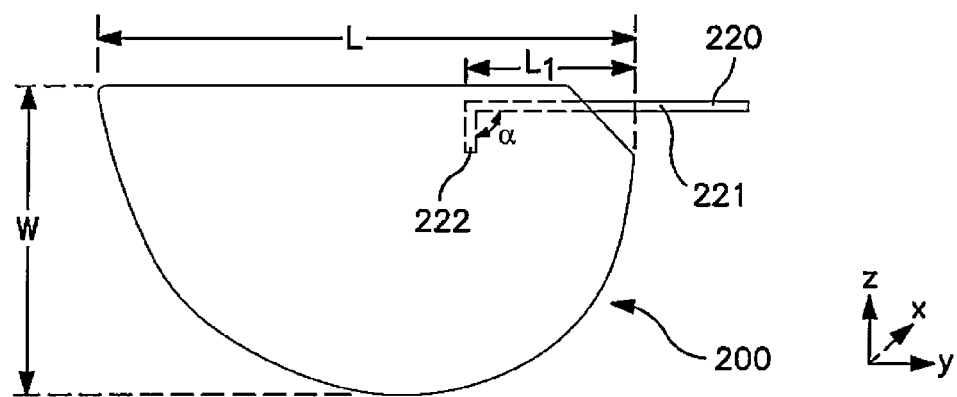
FIG. 2 is a top view of embodiment of an anode that may be employed in the capacitor of the present invention.
Figure 3:
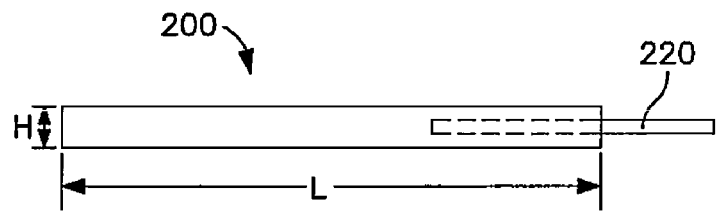
FIG. 3 is a frontal view of the anode of FIG. 2.

Due to the thin nature of the planar anode, it is sometimes desirable to control the manner in which the anode wire is inserted to limit the extent that stresses applied during manufacturing will cause the wire to pull out of the anode. For example, in one embodiment, at least a portion of the wire within the anode is bent at an angle relative to the longitudinal axis of the wire. This "bend" reduces the ease to which the wire can be pulled out in the longitudinal direction after the anode is pressed and sintered. Referring to FIGS. 2-3, for example, one embodiment of an anode 200 is shown that contains an anode wire 220. The anode wire contains a first portion 221 that extends in a longitudinal direction ("y" direction) from the anode 200. Within the body of the anode, the wire 200 also contains a second portion 222 that is bent at an angle "α" relative to the first portion 221. The angle "α" is typically from about 40° to about 120°, in some embodiments from about 60° to about 110°, and in some embodiments, from about 80° to about 100° (e.g., about 90°). Such a bent configuration may be achieved in a variety of different ways. For example, in one embodiment, a press mold may be partially filled with the flake powder, and then a "pre-bent" anode wire may be inserted into the press mold. Thereafter, the mold may be filled with powder and the entire assembly compressed into a pellet.

In addition to its geometric configuration, the extent to which the anode wire is inserted into the anode may also be controlled to help minimize the likelihood of withdrawal during manufacturing. That is, the wire is less likely to be pulled out of the anode the farther it is inserted. Of course, too great of a wire insertion can alter the uniformity of the press density, which can impact the resulting electrical performance of the anode. In this regard, the present inventors have discovered that the ratio of the length of the anode in which the wire is inserted to the entire length of the anode is typically from about 0.1 to about 0.6, and in some embodiments, from about 0.2 to about 0.5. In FIG. 2, for example, the length "$L_1$" represents the length of the anode 200 in which the anode wire 220 is inserted, while the length "L" represents the entire length of the anode 200. In certain cases, the length "L" of the anode 200 may range from about 1 to about 80 millimeters, in some embodiments from about 10 to about 60 millimeters, and in some embodiments, from about 20 to about 50 millimeters. Likewise, the length "$L_1$" may be from about 1 to about 40 millimeters, in some embodiments, from about 2 to about 20 millimeters, and in some embodiments, from about 5 to about 15 millimeters. The width "W" of the anode may also be from about 0.05 to about 40 millimeters, in some embodiments, from about 0.5 to about 25 millimeters, and in some embodiments, from about 2 to about 10 millimeters.

As indicated above, the thickness of the planar anode is small to improve the electrical performance and volumetric efficiency of the resulting capacitor. In FIG. 3, for example, the thickness of the anode 200 is represented by the dimension "H." Typically, the thickness of the anode is about 5 millimeters or less, in some embodiments, from about 0.05 to about 4 millimeters, and in some embodiments, from about 0.1 to about 3.5 millimeters. The ratio of the length of the anode to the thickness of the anode is from about 5 to about 50, in some embodiments from about 6 to about 30, and in some embodiments, from about 7 to about 20. Although shown as a "D-shape" in FIG. 2, it should also be understood that the anode may possess any other desired shape, such as square, rectangle, circle, oval, triangle, etc. Polygonal shapes having more than four (4) edges (e.g., hexagon, octagon, heptagon, pentagon, etc.) are particularly desired due to their relatively high surface area.

The anode also contains a dielectric formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. Aqueous solvents (e.g., water) and/or non-aqueous solvents (e.g., ethylene glycol) may be employed. To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs is typically high to achieve a capacitor capable of operating at a high voltage range. That is, the voltage is typically from about 100 volts to about 300 volts, in some embodiments from about 150 volts to about 250 volts, and in some embodiments, from about 170 volts to about 220 volts. The temperature of the anodizing solution may range from about 10° C. to about 200° C., in some embodiments from about 20° C. to about 60° C., and in some embodiments, from about 30° C. to about 40° C. (e.g., 37° C.). The resulting dielectric layer may be formed on a surface of the anode and within its pores. When employed, the specific nature of the powder may allow the resulting anode to achieve a high specific charge even at the high formation voltages often employed in the present invention. For example, within the ranges noted above, the anode may still be able to a specific charge of from about 2,000 $\mu F*V/g$ to about 20,000 $\mu F*V/g$, in some embodiments from about 5,000 $\mu F*V/g$ to about 15,000 $\mu F*V/g$ or more, and in some embodiments, from about 8,000 to about 12,000 $\mu F*V/g$.

II. Cathode

In addition to the anode, a cathode is also employed in the capacitor that may be constructed using any of a variety of techniques. In one embodiment, the cathode contains a metal substrate, which may include any metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. Titanium and tantalum, as well as alloys thereof, are particularly suitable for use in the present invention. The geometric configuration of the substrate may generally vary as is well known to those skilled in the art, such as in the form of a container, can, foil, sheet, screen, mesh, etc. In one embodiment, for example, the metal substrate forms a casing having a generally cylindrical shape. It should be understood, however, that any geometric configuration may be employed in the present invention, such as D-shaped, rectangular, triangular, prismatic, etc. The casing may optionally include a lid that covers the anode and electrolyte, which may be formed from the same or different material than the casing.

The substrate may be roughened to increase its surface area and increase the degree to which an electrochemically active material may be able to adhere thereto. In one embodiment, for example, the surface is chemically etched, such as by applying a solution of a corrosive substance (e.g., hydrochloric acid) to the surface. The surface may also be electrochemically etched, such as by applying a voltage to a solution of the corrosive substance so that it undergoes electrolysis. The voltage may be raised to a sufficiently high level to initiate "sparking" at the surface of the substrate, which is believed to create high local surface temperatures sufficient that etches away the substrate. This technique is described in more detail in U.S. patent application Publication No. 2010/0142124 to Dreissig, et al., which is incorporated herein in its entirety by reference thereto for all purposes. In addition to chemical or electrochemical roughening techniques, mechanical roughening may also be employed. In one embodiment, for instance, the surface of the metal substrate may be abrasive blasted by propelling a stream of abrasive media (e.g., sand) against at least a portion of a surface thereof.

An electrochemically-active material may also be applied to the cathode substrate to inhibit corrosion and also act as a heat barrier when voltage is increased. Any of a variety of known electrochemically-active materials may generally be employed. One suitable material is a conductive polymer, such as those that are π-conjugated and have electrical conductivity after oxidation or reduction (e.g., electrical conductivity of at least about 1 μS cm$^{-1}$ after oxidation). Examples of such π-conjugated conductive polymers include, for instance, polyheterocycles (e.g., polypyrroles, polythiophenes, polyanilines, etc.), polyacetylenes, poly-p-phenylenes, polyphenolates, and so forth.

Substituted polythiophenes are particularly suitable for use as the electrochemically active material in the present invention. Without intending to be limited by theory, it is believed that charging of the capacitor to a high voltage (e.g., greater than the formation voltage) forces ions of the electrolyte into coatings containing such substituted polythiophenes. This causes the conductive polymer to "swell" and retain the ions near the surface, thereby enhancing charge density. Because the polymer is generally amorphous and non-crystalline, it can also dissipate and/or absorb the heat associated with the high voltage. Upon discharge, it is also believed that the substituted polythiophene "relaxes" and allows ions in the electrolyte to move out of the coating. Through such swelling and relaxation mechanism, charge density near the metal substrate can be increased without a chemical reaction with the electrolyte. Accordingly, mechanical robustness and good electrical performance may be provided without the need for conventional conductive coatings, such as those made from activated carbon or metal oxides (e.g., ruthenium oxide). In fact, excellent results may be achieved using the coating as the principal material on the metal substrate. That is, the coating may constitute at least about 90 wt. %, in some embodiments at least about 92 wt. %, and in some embodiments, at least about 95 wt. % of the material(s) present on the metal substrate. Nevertheless, it should be understood that other conductive coatings may also be used in some embodiments of the present invention.

In one particular embodiment, the substituted polythiophene has recurring units of general formula (I), formula (II), or both:

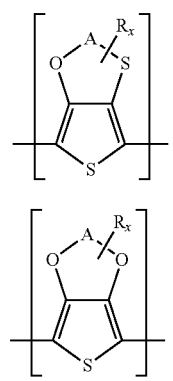

wherein,

A is an optionally substituted $C_1$ to $C_5$ alkylene radical (e.g., methylene, ethylene, n-propylene, n-butylene, n-pentylene, etc.);

R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n -undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and x is an integer from 0 to 8, in some embodiments, from 0 to 2, and in some embodiments, x is 0. Example of substituents for the radicals "A" or "R" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

The total number of recurring units of general formula (I) or formula (II) or of general formulae (I) and (II) is typically from 2 to 2,000, and in some embodiments, from 2 to 100.

Particularly suitable substituted polythiophenes are those in which "A" is an optionally substituted $C_2$ to $C_3$ alkylene radical and x is 0 or 1. In one particular embodiment, the substituted polythiophene is poly(3,4-ethylenedioxythiophene) ("PEDT"), which has recurring units of formula (II), wherein "A" is $CH_2$—$CH_2$ and "x" is 0. The monomers used to form such polymers may vary as desired. For instance, particularly suitable monomers are substituted 3,4-alkylenedioxythiophenes having the general formula (III), (IV), or both:

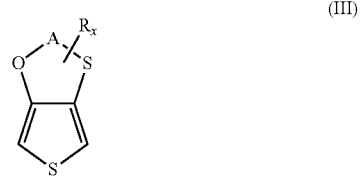

wherein, A, R, and X are as defined above.

Examples of such monomers include, for instance, optionally substituted 3,4-ethylenedioxythiophenes. One commercially suitable example of 3,4-ethylenedioxythiophene is available from H.C. Starck GmbH under the designation Clevios™ M. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers, such as described above, may be chemically polymerized in the presence of an oxidative catalyst. The oxidative catalyst typically includes a transition metal cation, such as iron(III), copper(II), chromium(VI), cerium(IV), manganese(IV), manganese(VII), ruthenium (III) cations, etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron (III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron (III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from H.C. Starck GmbH under the designation Clevios™ C.

Various methods may be utilized to form the conductive coating on a metal substrate. In one embodiment, the oxidative catalyst and monomer are applied, either sequentially or together, such that the polymerization reaction occurs in situ on the part. Suitable application techniques may include screen-printing, dipping, electrophoretic coating, and spraying, may be used to form a conductive polymer coating. As an example, monomer may initially be mixed with the oxidative catalyst to form a precursor solution. Once the mixture is formed, it may be applied to the metal substrate and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The substrate may then be dried to remove the solvent therefrom. Thereafter, the substrate may be dipped into a solution containing the monomer.

Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Publication No. 2008/232037 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to in situ application, the conductive coating may also be applied to the substrate in the form of a dispersion of conductive polymer particles. Although their size may vary, it is typically desired that the particles possess a small diameter to increase the surface area available for adhering to the anode part. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymers into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophenes in a given layer is typically from about 0.5:1 to about 50:1, in some embodiments from about 1:1 to about 30:1, and in some embodiments, from about 2:1 to about 20:1. The weight of the substituted polythiophene corresponds referred to the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers ("μm") to about 50 μm, in some embodiments from about 0.5 μm to about 20 μm, and in some embodiments, from about 1 μm to about 5 μm. It should be understood that the thickness of the coating is not necessarily the same at all locations on the metal substrate. Nevertheless, the average thickness of the coating on the substrate generally falls within the ranges noted above.

The conductive polymer coating may optionally be healed. Healing may occur after each application of a conductive polymer layer or may occur after the application of the entire conductive polymer coating. In some embodiments, the conductive polymer can be healed by dipping the metal substrate into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

III. Working Electrolyte

The capacitor of the present invention also employs a working electrolyte that is the electrically active material that provides the connecting path between the anode and cathode. The working electrolyte is generally in the form of a liquid, such as a solution (e.g., aqueous or non-aqueous), dispersion, gel, etc. If desired, the anode may initially be impregnated with an electrolyte (not shown) before being positioned within the casing. The electrolyte may also be added to the capacitor at a later stage of production. Various suitable electrolytes are described in U.S. Pat. Nos. 5,369,547 and 6,594,140 to Evans, et al., which are incorporated herein their entirety by reference thereto for all purposes.

Typically, the electrolyte is ionically conductive in that has an ionic conductivity of from about 0.5 to about 100 milliSiemens per centimeter ("mS/cm"), in some embodiments from about 1 to about 80 mS/cm, in some embodiments from about 5 mS/cm to about 60 mS/cm, and in some embodiments, from about 10 to about 40 mS/cm, determined at a temperature of 25° C. using any known electric conductivity meter (e.g., Oakton Con Series 11). Within the ranges noted above, it is believed that the ionic conductivity of the electrolyte allows the electric field to extend into the electrolyte to a length (Debye length) sufficient to result in significant charge separation. This extends the potential energy of the dielectric to the electrolyte so that the resulting capacitor is able to store even more potential energy than predicted by the thickness of the dielectric. In other words, the capacitor may be charged to a voltage that exceeds the formation voltage of the dielectric. The ratio of the voltage to which the capacitor can be charged to the formation voltage may, for instance, be greater than about 1, in some embodiments from about 1 to about 2, and in some embodiments, from about 1.1 to about 1.5. As an example, the voltage to which the capacitor is charged may be from about 120 volts to about 320 volts, in some embodiments from about 180 volts to about 280 volts, and in some embodiments, from about 200 volts to about 240 volts.

The desired ionic conductivity may be achieved by selecting ionic compound(s) (e.g., acids, bases, salts, and so forth) within certain concentration ranges. In one particular embodiment, salts of weak organic acids may be effective in achieving the desired conductivity of the electrolyte. The cation of the salt may include monatomic cations, such as alkali metals (e.g., $Li^+$, $Na^+$, $K^+$, $Rb^+$, or $Cs^+$), alkaline earth metals (e.g., $Be^{2+}$, $Mg^{2+}$, $Ca^{2+}$, $Sr^{2+}$ or $Ba^{2+}$), transition metals (e.g., $Ag^+$, $Fe^{2+}$, $Fe^{3+}$, etc.), as well as polyatomic cations, such as $NH_4^+$. The monovalent ammonium ($NH_4^+$), sodium ($Na^+$), and lithium ($Li^+$) are particularly suitable cations for use in the present invention. The organic acid used to form the anion of the salt is "weak" in the sense that it typically has a first acid dissociation constant ($pK_{a1}$) of about 0 to about 11, in some embodiments about 1 to about 10, and in some embodiments, from about 2 to about 10, determined at 25° C. Any suitable weak organic acids may be used in the present invention, such as carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid (e.g., dextotartaric acid, mesotartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), α-tartaric acid ($pK_{a1}$ of 2.98 and $pK_{a2}$ of 4.34), meso-tartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc.

While the actual amounts may vary depending on the particular salt employed, its solubility in the solvent(s) used in the electrolyte, and the presence of other components, such weak organic acid salts are typically present in the electrolyte in an amount of from about 0.1 to about 25 wt. %, in some embodiments from about 0.2 to about 20 wt. %, in some embodiments from about 0.3 to about 15 wt. %, and in some embodiments, from about 0.5 to about 5 wt. %.

The electrolyte is typically aqueous in that it contains an aqueous solvent, such as water (e.g., deionized water). For example, water (e.g., deionized water) may constitute from about 20 wt. % to about 95 wt. %, in some embodiments from about 30 wt. % to about 90 wt. %, and in some embodiments, from about 40 wt. % to about 85 wt. % of the electrolyte. A secondary solvent may also be employed to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); and so forth. Such solvent mixtures typically contain water in an amount from about 40 wt. % to about 80 wt. %, in some embodiments from about 50 wt. % to about 75 wt. %, and in some embodiments, from about 55 wt. % to about 70 wt. % and secondary solvent (s) in an amount from about 20 wt. % to about 60 wt. %, in some embodiments from about 25 wt. % to about 50 wt. %, and in some embodiments, from about 30 wt. % to about 45 wt. %. The secondary solvent(s) may, for example, constitute from about 5 wt. % to about 45 wt. %, in some embodiments from about 10 wt. % to about 40 wt. %, and in some embodiments, from about 15 wt. % to about 35 wt. % of the electrolyte.

If desired, the electrolyte may be relatively neutral and have a pH of from about 4.5 to about 7.0, in some embodiments from about 5.0 to about 6.5, and in some embodiments, from about 5.5 to about 6.0. Among other things, such a pH may enhance the ability of hydrogen ions present in an aqueous electrolyte to interact with the cathode material to achieve maximum capacitance and thus energy density. One or more pH adjusters (e.g., acids, bases, etc.) may be employed to help achieve the desired pH. In one embodiment, an acid is employed to lower the pH to the desired range. Suitable acids include, for instance, inorganic acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. Although the total concentration of pH adjusters may vary, they are typically present in an amount of from about 0.01 wt. % to about 10 wt. %, in some embodiments from about 0.05 wt. % to about 5 wt. %, and in some embodiments, from about 0.1 wt. % to about 2 wt. % of the electrolyte.

The electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroacetophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth.

Figure 4:
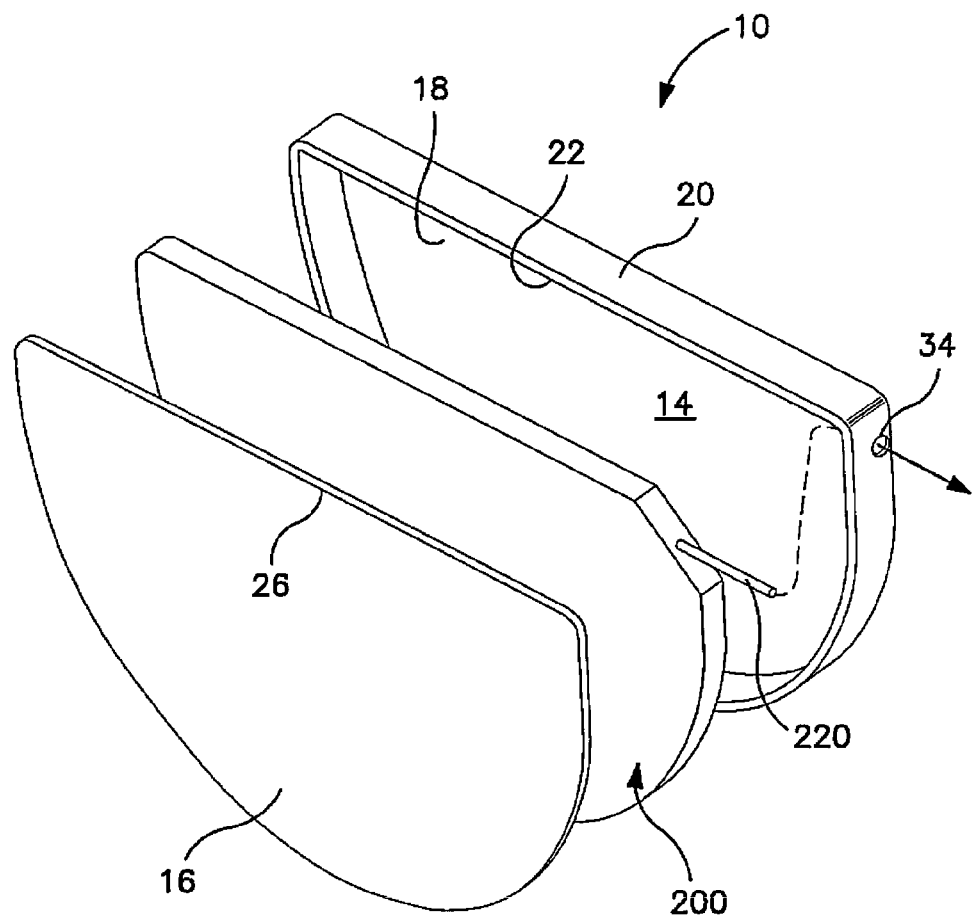
FIG. 4 is a perspective view illustrating the assembly of the anode of FIG. 2 with casing components to form the capacitor shown in FIG. 1.

The particular manner in which the components are incorporated into the capacitor is not critical and may be accomplished using a variety of techniques. In most embodiments, however, the anode is positioned within a casing. Referring to FIGS. 1 and 4, for example, one embodiment of a capacitor 10 is shown that includes the anode 200 shown in FIGS. 2-3. Although only one anode is shown, it should be understood that multiple anodes (e.g., stack) may be employed as is described, for instance, in U.S. Pat. No. 7,483,260 to Ziarniak, et al. In the illustrated embodiment, the anode 200 may be positioned within a casing 12 made of a first casing member 14 and a second casing member 16. The first casing member 14 has a sidewall 18 joined to a surrounding sidewall 20 extending to an edge 22. The second casing member 16 is in the shape of a plate and contains a second face wall 24 having a surrounding edge 26. The casing members 14 and 16 may be hermetically sealed together by welding (e.g., laser welding) the overlapping edges 22 and 26 where the contact each other. The casing members 14 and/or 16 may be analogous to the metal substrate described above such that an electrochemically-active material (not shown) may be deposited on the interior surface thereof. Alternatively, a separate metal substrate may be located adjacent to the casing member 14 and/or 16 and applied with the electrochemically-active material.

Although not shown, one or more separators may be employed that help insulate the anode and electrochemically-active material from each other. Examples of suitable materials for this purpose include, for instance, porous polymer materials (e.g., polypropylene, polyethylene, etc.), porous inorganic materials (e.g., fiberglass mats, porous glass paper, etc.), ion exchange resin materials, etc. Particular examples include ionic perfluoronated sulfonic acid polymer membranes (e.g., Nafion™ from the E.I. DuPont de Nemeours & Co.), sulphonated fluorocarbon polymer membranes, polybenzimidazole (PBI) membranes, and polyether ether ketone (PEEK) membranes. Although preventing direct contact between the anode and cathode, the separator permits ionic current flow of the electrolyte to the electrodes.

A feedthrough 30 may also be employed that electrically insulates the anode wire 200 from the casing 12. The feedthrough 30 extends from within the casing 12 to the outside thereof. A hole 34 may be provided in the surrounding sidewall 20 of the casing member 14 into which the feedthrough 30. The feedthrough 30 may, for example, be a glass-to-metal seal ("GTMS") that contains a ferrule (not shown) with an internal cylindrical bore of a constant inside diameter. An insulative glass can thus provide a hermetic seal between the bore and the anode wire 200 passing therethrough.

After assembly and sealing (e.g., welding), an electrolyte may be introduced into the casing through a fill-port. Filling may be accomplished by placing the capacitor in a vacuum chamber so that the fill-port extends into a reservoir of the electrolyte. When the chamber is evacuated, pressure is reduced inside the capacitor. When the vacuum is released, pressure inside the capacitor re-equilibrates, and the electrolyte is drawn through the fill-port into the capacitor.

Regardless of its particular configuration, the capacitor of the present invention may exhibit excellent electrical properties. For example, the capacitor may exhibit a high volumetric efficiency, such as from about 50,000 $\mu F*V/cm^3$ to about 300,000 $\mu F*V/cm^3$, in some embodiments from about 60,000 $\mu F*V/cm^3$ to about 200,000 $\mu F*V/cm^3$, and in some embodiments, from about 80,000 $\mu F*V/cm^3$ to about 150,000 $\mu F*V/cm^3$, determined at a frequency of 120 Hz and at room temperature (e.g., 25° C.). Volumetric efficiency is determined by multiplying the formation voltage of a part by its capacitance, and then dividing by the product by the volume of the part. For example, a formation voltage may be 175 volts for a part having a capacitance of 520 $\mu F$, which results in a product of 91,000 $\mu F*V$. If the part occupies a volume of about 0.8 $cm^3$, this results in a volumetric efficiency of about 113,750 $\mu F*V/cm^3$.

The capacitor may also exhibit a high energy density that enables it suitable for use in high pulse applications. Energy density is generally determined according to the equation $E=\frac{1}{2}*CV^2$, where C is the capacitance in farads (F) and V is the working voltage of capacitor in volts (V). The capacitance may, for instance, be measured using a capacitance meter (e.g., Keithley 3330 Precision LCZ meter with Kelvin Leads, 2 volts bias and 1 volt signal) at operating frequencies of from 10 to 120 Hz (e.g., 120 Hz) and a temperature of 25° C. For example, the capacitor may exhibit an energy density of about 2.0 joules per cubic centimeter ($J/cm^3$) or more, in some embodiments about 3.0 $J/cm^3$, in some embodiments from about 3.5 $J/cm^3$ to about 10.0 $J/cm^3$, and in some embodiments, from about 4.0 to about 8.0 $J/cm^3$. The capacitance may likewise be about 1 milliFarad per square centimeter ("$mF/cm^2$") or more, in some embodiments about 2 $mF/cm^2$ or more, in some embodiments from about 5 to about 50 $mF/cm^2$, and in some embodiments, from about 8 to about 20 $mF/cm^2$.

The capacitor may also exhibit a relatively high "breakdown voltage" (voltage at which the capacitor fails), such as about 180 volts or more, in some embodiments about 200 volts or more, and in some embodiments, from about 210 volts to about 260 volts.

The equivalent series resistance ("ESR")—the extent that the capacitor acts like a resistor when charging and discharging in an electronic circuit—may also be less than about 15,000 milliohms, in some embodiments less than about 10,000 milliohms, in some embodiments less than about 5,000 milliohms, and in some embodiments, from about 1 to about 4,500 milliohms, measured with a 2-volt bias and 1-volt signal at a frequency of 120 Hz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 $\mu A/\mu F*V$, in some embodiments less than about 0.5 $\mu A/\mu F*V$, and in some embodiments, less than about 0.1 $\mu A/\mu F*V$, where $\mu A$ is microamps and $\mu F*V$ is the product of the capacitance and the rated voltage. Leakage current may be measured using a leakage test meter (e.g., MC 190 Leakage test, Mantracourt Electronics LTD, UK) at a temperature of 25° C. and at a certain rated voltage after a charging time of from about 60 to about 300 seconds. Such ESR and normalized leakage current values may even be maintained after aging for a substantial amount of time at high temperatures. For example, the values may be maintained for about 100 hours or more, in some embodiments from about 300 hours to about 2500 hours, and in some embodiments, from about 400 hours to about 1500 hours (e.g., 500 hours, 600 hours, 700 hours, 800 hours, 900 hours, 1000 hours, 1100 hours, or 1200 hours) at temperatures ranging from about 100° C. to about 250° C., and, in some embodiments from about 100° C. to about 200° C. (e.g., 100° C., 125° C., 150° C., 175° C., or 200° C.).

The electrolytic capacitor of the present invention may be used in various applications, including but not limited to medical devices, such as implantable defibrillators, pacemakers, cardioverters, neural stimulators, drug administering devices, etc.; automotive applications; military applications, such as RADAR systems; consumer electronics, such as radios, televisions, etc.; and so forth. In one embodiment, for example, the capacitor may be employed in an implantable medical device configured to provide a therapeutic high voltage (e.g., between approximately 500 volts and approximately 850 volts, or, desirably, between approximately 600 Volts and approximately 900 volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device may also contain a capacitor bank that typically contains two or more capacitors connected in series and coupled to a battery that is internal or external to the device and supplies energy to the capacitor bank. Due in part to high conductivity, the capacitor of the present invention can achieve excellent electrical properties and thus be suitable for use in the capacitor bank of the implantable medical device.

The present invention may be better understood by reference to the following examples.

EXAMPLE 1

The electrical properties of anodes formed from NH175 nodular tantalum powder (H.C. Starck), TU4D nodular/flake tantalum powder (Cabot Corp.), and C255 flake tantalum powder (Cabot Corp.) were tested. More particularly, samples of each powder type were pressed to 6.5 $g/cm^3$ density using a 0.5% PEG lubricant. The NH175 powder had such a low Scott density that the pellet length had to be shortened. After delubrication, samples of each powder were then vacuum sintered at 1550° C., 1600° C., 1650° C., and 1700° C. for 40 minutes in a hanging crucible. Upon sintering, the pellets were anodized in a solution containing 50% glycol/water with $H_3PO_4$ at a temperature of 85° C. and a conductivity of 1.3 mS/cm. The formation current density was 45 mA/g for each sample. Formation voltages of 175 volts, 200 volts, and 225 volts were tested.

Figure 6:
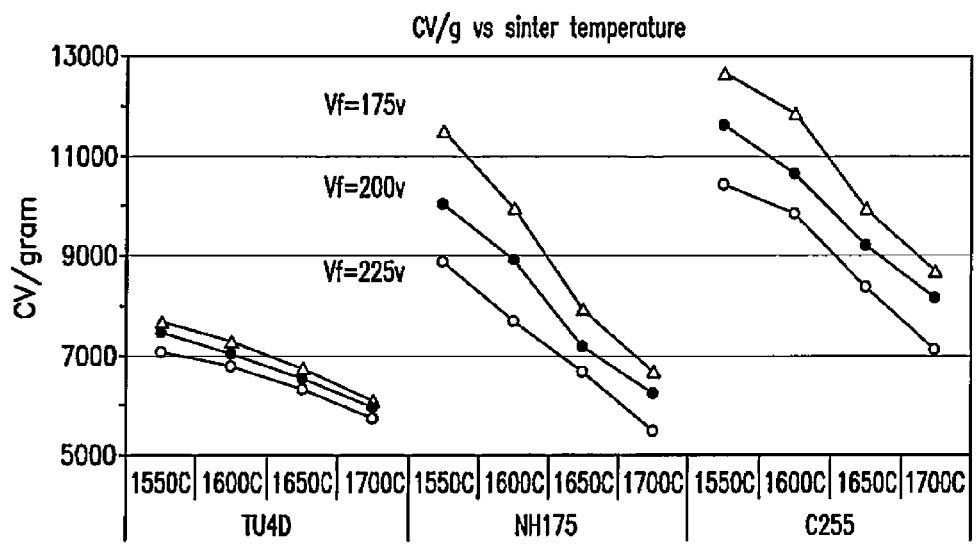
FIG. 6 shows the specific charge of anodes formed in Example 1 at various sintering temperatures.
Figure 7:
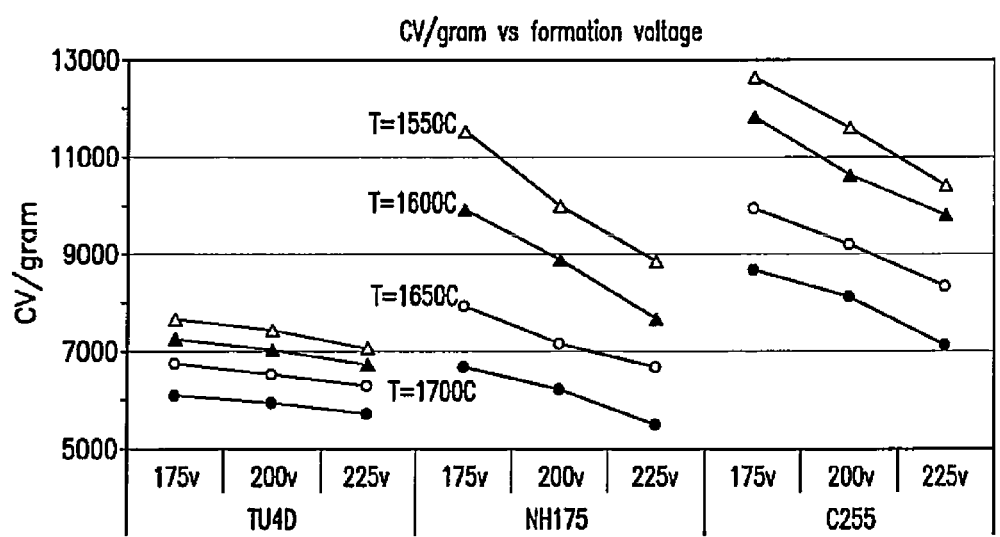
FIG. 7 shows the specific charge of anodes formed in Example 1 at various formation voltages.
Figure 8:
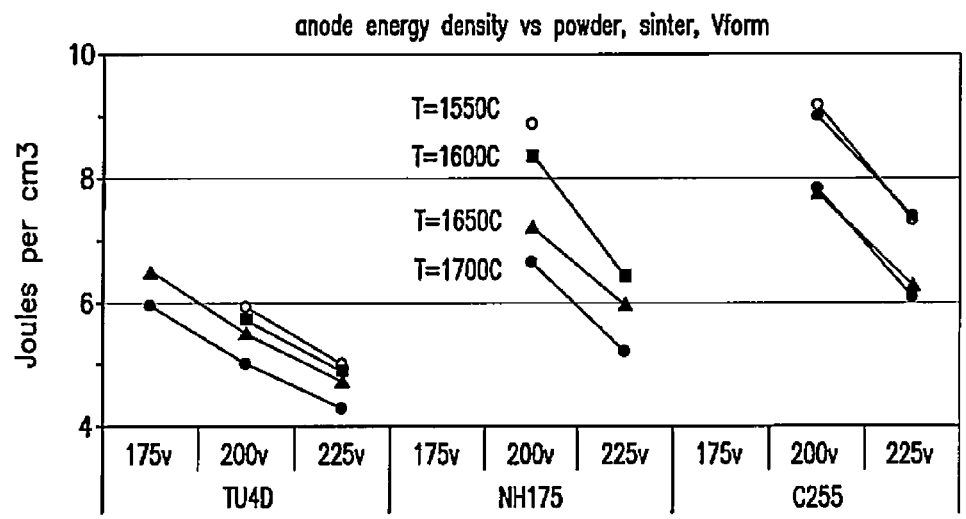
FIG. 8 shows the energy density of anodes formed in Example 1 at various sintering temperatures and formation voltages.

The resulting anodes were then tested for capacitance (at 120 Hz, room temperature) in an aqueous electrolyte containing sulfuric acid (5 M). The specific charge (CV/g) was then determined for each type of powder at the different sintering temperatures (1550° C., 1600° C., 1650° C., and 1700° C.) and formation voltages (175 V, 200 V, and 225 V). The results are shown in FIGS. 6-7. As shown, the C-255 flake powder was able to achieve a comparatively high specific charge at various sintering temperature and formation voltages. Using the capacitance values obtained and assuming an operating voltage of 212 volts, energy density (E=0.5*$CV^2$) was also calculated. The results are shown in FIG. 8. As indicated, the low CV/g of the TU4D powder significantly diminished its energy density. To the contrary, the C255 flake powder exhibited the highest energy density.

Two units from each combination of powder, sintering temperature, and formation voltage were also tested for breakdown voltage as follows. A 300 volt, 1.5 amp power supply was set to the lowest current value and the highest voltage value. One unit at a time was tested with no series resistor, Testing was conducted in a neutral electrolyte at room temperature. The voltage rise was recorded while applying the low constant current. Eventually, the voltage stopped rising when the leakage current reached the value of the current limit setting. The transition was not abrupt, but nevertheless a "breakdown voltage" was roughly defined as the point at which the voltage rise leveled off significantly. The results are set forth in more detail in Table 1.

TABLE 1

Breakdown Voltages of Samples

|  | 1550 C. | 1600 C. | 1650 C. | 1700 C. |
|---|---|---|---|---|
| TU4D |  |  |  |  |
| Vf = 175 v | 240 | 245 | 250 | 253 |
| Vf = 200 v | 270 | 275 | 282 | 287 |
| Vf = 225 v | 285 | 288 | 295 | 300 |
| NH175 |  |  |  |  |
| Vf = 175 v | 215 | 224 | 236 | 245 |
| Vf = 200 v | 246 | 260 | 275 | 285 |
| Vf = 225 v | fail | 280 | 290 | 300 |
| C255 |  |  |  |  |
| Vf = 175 v | 225 | 226 | 235 | 237 |
| Vf = 200 v | 258 | 262 | 266 | 272 |
| Vf = 225 v | 285 | 288 | 292 | 300 |

EXAMPLE 2

The ability to form a capacitor in accordance with the present invention was demonstrated. Initially, both ends of a pre-cut tantalum lead wire were bent. The bent wire was placed into a slot in the bottom half of a mold. The cavity of the mold was then filled with C255 flake tantalum powder (Cabot Corp.) and polyethylene glycol lubricant (0.5%). A hydraulic press was used to compress both sides of the powder to a density of 7.5 g/cm$^3$ density to form thirty two (32) anode samples. After delubrication, sixteen (16) of the samples were vacuum sintered at 1600° C. for 40 minutes in a hanging crucible and sixteen (16) of the samples were vacuum sintered at 1650° C. for 40 minutes in a hanging crucible. Upon sintering, all of the samples were anodized in a solution containing 50% glycol/water with $H_3PO_4$ at a temperature of 85° C. and a conductivity of 1.3 mS/cm. The formation current density was 45 mA/g for each sample and the soak time was 90 minutes. Formation voltages of 200 volts and 225 volts were employed. Following the first formation, the oxide was annealed at 380° C. for 60 minutes. This was then followed by a second formation of 15 minutes at the same voltage. The resulting anode had a D-shape in which the length "L" was about 37 millimeters, the width "W" was about 20 millimeters, and the thickness "H" was about 2.1 millimeters (FIGS. 2-3).

Figure 9:
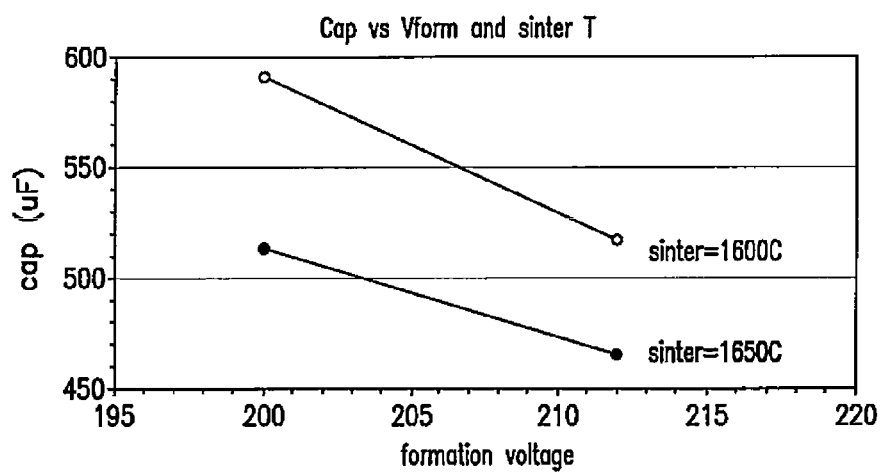
FIG. 9 shows the capacitance of anodes formed in Example 2 at various sintering temperatures and formation voltages.
Figure 10:
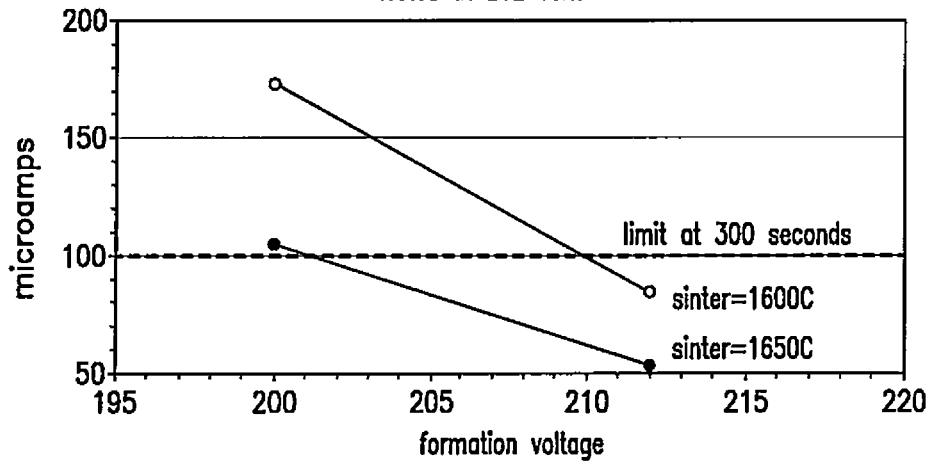
FIG. 10 shows the leakage current (at 300 seconds) of anodes formed in Example 2 at various sintering temperatures and formation voltages.
Figure 11:
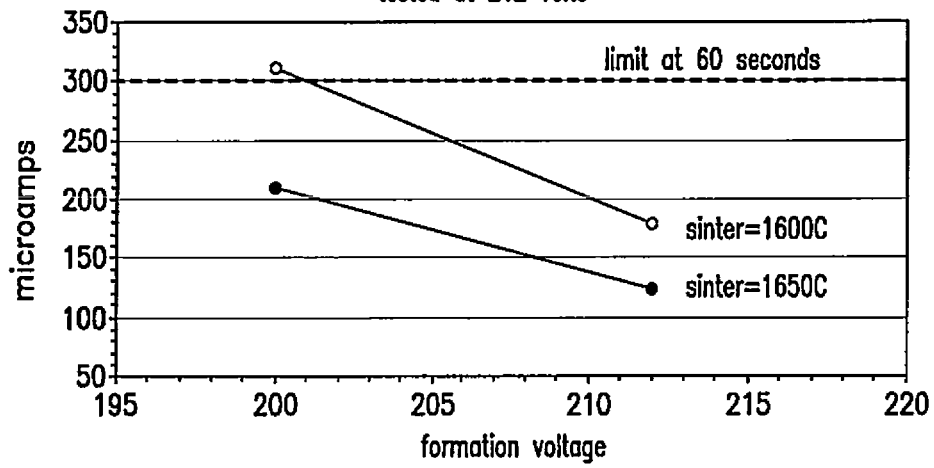
FIG. 11 shows the leakage current (at 60 seconds) of anodes formed in Example 2 at various sintering temperatures and formation voltages.

Once formed, capacitance ("Cap") and leakage current ("DCL") were tested in a neutral electrolyte at room temperature. Capacitance was measured by discharging from 150 volts through a 10,000 ohm resistor. Leakage current was determined by charging to 212 volts with a 1,000 ohm resistor in series and calculating the voltage drop across the resistor. The results are set forth in FIGS. 9-11.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:
    a planar anode having a length of from about 20 millimeters to about 50 millimeters and a thickness, wherein the ratio of the length of the anode to the thickness of the anode is from about 7 to about 20, wherein the anode includes an anodically oxidized pellet formed from a pressed and sintered electrically conductive powder, wherein the powder is formed from a plurality of flake particles having an aspect ratio of from about 2 to about 100;
    a cathode that comprises a metal substrate coated with an electrochemically active material; and
    an aqueous electrolyte in communication with the anode and the cathode, wherein the electrolyte has a pH of from about 4.5 to about 7.0, and wherein the ratio of the voltage to which the capacitor is capable of being charged to the voltage at which the dielectric layer is formed is greater than about 1.

2. The wet electrolytic capacitor of claim 1, wherein powder is formed from a plurality of flake particles having an aspect ratio of from about 4 to about 30.

3. The wet electrolytic capacitor of claim 1, wherein the anode has a D-shape.

4. The wet electrolytic capacitor of claim 1, wherein the metal substrate includes titanium.

5. The wet electrolytic capacitor of claim 1, wherein the electrochemically-active material includes a conductive polymer.

6. The wet electrolytic capacitor of claim 5, wherein the conductive polymer is a substituted polythiophene.

7. The wet electrolytic capacitor of claim 6, wherein the substituted polythiophene is poly(3,4-ethylenedioxythiophene).

8. The wet electrolytic capacitor of claim 1, wherein the pH is from about 5.0 to about 6.5.

9. The wet electrolytic capacitor of claim 1, wherein the capacitor contains only a single anode.

10. The wet electrolytic capacitor of claim 1, wherein the voltage to which the capacitor is capable of being charged is from about 180 volts to about 280 volts.

11. The wet electrolytic capacitor of claim 1, wherein the capacitor exhibits a volumetric efficiency of from 80,000 µF*V/cm$^3$ to about 150,000 µFV/cm$^3$, determined at a frequency of 120 Hz and temperature of 25° C.

12. The wet electrolytic capacitor of claim 1, wherein the capacitor exhibits an energy density of from about 3.5 J/cm$^3$ to about 10.0 J/cm$^3$, determined at a frequency of 120 Hz and temperature of 25° C.

13. The wet electrolytic capacitor of claim 1, wherein the capacitor exhibits a breakdown voltage of about 200 volts or more.

14. The wet electrolytic capacitor of claim 1, wherein the capacitor exhibits an equivalent series resistance of from about 1 to about 4,500 milliohms, determined at a frequency of 120 Hz.

15. The wet electrolytic capacitor of claim 1, wherein the powder has a bulk density of from about 0.1 to about 2 grams per cubic centimeter.

16. The wet electrolytic capacitor of claim 1, wherein the particles have an average size of from about 0.1 to about 100 micrometers.

17. The wet electrolytic capacitor of claim 1, wherein the particles have a specific surface area of from about 0.5 to about 10.0 meters squared per gram.

* * * * *

UNITED STATES PATENT AND TRADEMARK OFFICE
CERTIFICATE OF CORRECTION

| | | |
|---|---|---|
| PATENT NO. | : 8,687,347 B2 | Page 1 of 1 |
| APPLICATION NO. | : 13/005104 | |
| DATED | : April 1, 2014 | |
| INVENTOR(S) | : James Steven Bates and Robert Hazen Pease | |

It is certified that error appears in the above-identified patent and that said Letters Patent is hereby corrected as shown below:

On the Title Page

Item (56) under Foreign Patent Documents

"WO 93/03101 A1 2/1993" should read --WO 93/03191 A1 2/1993--

Signed and Sealed this
Twelfth Day of August, 2014

Michelle K. Lee
*Deputy Director of the United States Patent and Trademark Office*